Patented Oct. 25, 1949

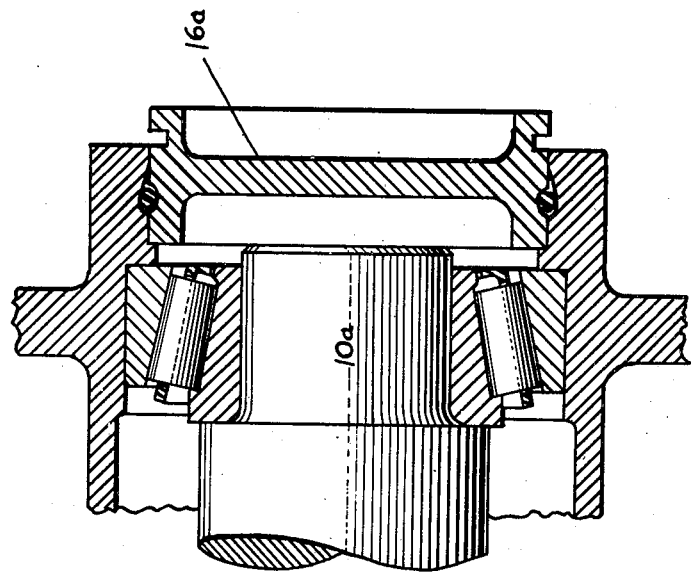
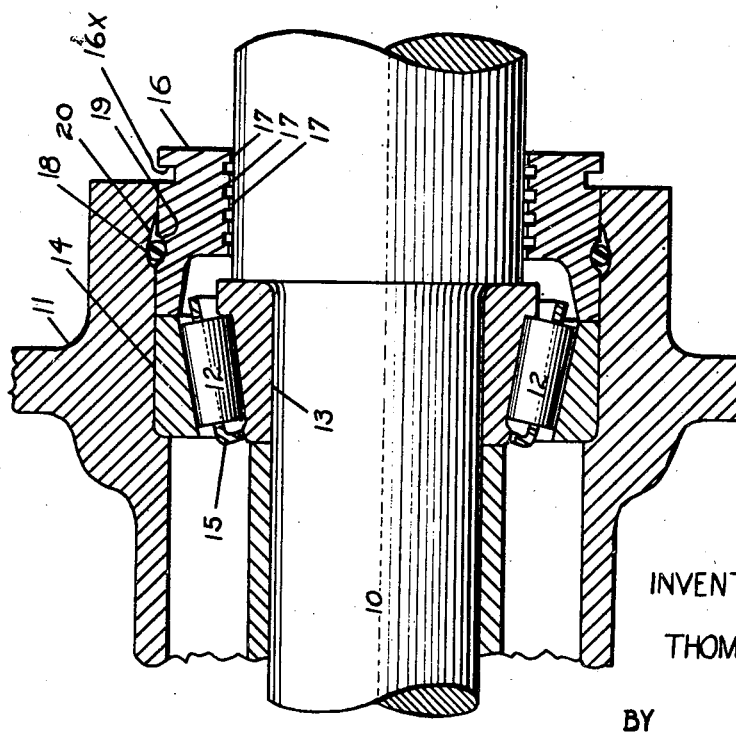

2,486,270

UNITED STATES PATENT OFFICE 2,486,270

GREASE GUARD FOR ANTI-FRICTION BEARINGS

Thomas L. Fawick, Cleveland, Ohio

Application August 10, 1946, Serial No. 689,679

5 Claims. (Cl. 308—187.1)

1

This invention relates to grease guards for anti-friction bearings.

Its chief objects are to provide a guard adapted for quick and easy mounting and dismounting and to provide economy of construction.

Of the accompanying drawings:

Fig. 1 is an axial section of a roller-bearing assembly embodying my invention in one of its preferred forms.

Fig. 2 is an axial section of another assembly in which the shaft projects only a little way beyond the bearing and the guard is so formed as to close off both the bearing and the end of the shaft.

Referring to the drawings, the assembly of Fig. 1 comprises a shaft 10 journaled in a housing 11 by means of a roller bearing comprising rollers 12, 12, an inner race 13, an outer race 14 and a roller cage 15.

The cylindrical inner face of the housing which provides the seat for the outer bearing race 14 extends beyond the race to provide a socket for an annular plug-like grease guard 16 which surrounds the shaft 10 and at its inner periphery is preferably formed with a plurality of annular ribs 17, 17 which define intervening grooves and lessen migration of grease, between the guard and the shaft, from the bearing.

To seal the guard 16 against the wall of its socket in the housing, where centrifugal force is a factor in the accumulation of grease, an annular cross-sectionally circular gasket 18 is interposed between the two members and is adapted to be put under generally radial compression in the forcing of the plug portion of the guard into its socket.

To compel the gasket 18 to move with the guard's plug portion into the socket the gasket is mounted, under slight circumferential tension, in an annular groove 19 formed in the guard, and the wall of the groove is transversely curved on a somewhat greater radius than that of the gasket, to provide "flow space" for deformation of the gasket as it is forced into the socket.

At a little distance from the mouth of the socket its wall is formed with an annular groove 20 having the gasket-contacting part of its wall flared in the direction toward the bearing, so that the chief compressive forces in the gasket, normal to the said surface of the groove, are oblique to the axis of the shaft and thus hold the guard in abutted relation to the outer bearing race 14.

The gasket 18 preferably is formed of an oil-resistant synthetic material having substantially the resilient deformability of vulcanized soft-rubber, examples being neoprene, chlor-butadiene, polymerized vinyl chloride, and co-polymers of vinyl chloride and vinyl acetate.

By reason of its resilient deformability the gasket permits the guard to be quickly and easily mounted and dismounted, although sufficiently resisting removal of the guard to hold the latter in place except when it is desired to remove it.

Preferably the guard is formed with an annular groove $16^x$ to facilitate its removal from the socket by engagement with a suitable tool.

When, as shown, the groove 16 is so formed as to provide appropriate "flow space" for the gasket, the cylindrical portions of the outer surface of the guard can be of such diameter as to have a close, sliding fit in the socket, as shown.

The assembly shown in Fig. 2 corresponds closely to that of Fig. 1 except that the shaft, 10a, projects only a little way beyond the bearing and the guard, 16a, instead of being annular to surround the shaft, is of such closed form as to close off both the shaft-end and the bearing.

Further modifications are possible within the scope of the appended claims.

I claim:

1. A bearing assembly comprising two relatively rotatable members, one within the other, and, interposed between the two, an anti-friction bearing and a grease guard therefor, the grease guard comprising a rigid, axially removable member and a gasket held under compression between said rigid member and one of the first said members, the two members between which the gasket is so held being formed with respective annular grooves in which the gasket is seated, the assembly comprising a pair of stop faces limiting movement of the guard toward the bearing and a wall of one of the grooves being so oblique to the axis of rotation as to cause the gasket to hold one of said stop-faces against the other.

2. A bearing assembly comprising two relatively rotatable members, one within the other, and defining a grease-guard-receiving space, and, mounted in said space, a grease guard comprising an axially removable guard member and a gasket held under compression between said guard member and one of the first said members, the two members between which the gasket is so held being formed with respective annular grooves in which the gasket is seated, the assembly comprising a pair of stop faces limiting movement of the guard toward the bearing and a wall of one of the grooves being so oblique to the axis of rotation as to cause the gasket to hold one of the stop faces against the other.

3. A bearing assembly comprising two relatively rotatable members, one within the other, and defining a grease-guard-receiving space, and, mounted in said space, a guard member axially movable with relation to the two first mentioned members and having an annular face closely presented to an annular face of one of them, the two said faces being formed with respective annular grooves facing each other, and a resiliently deformable sealing ring of which the inner periphery is in one and the outer periphery is in the other of said grooves, the sealing ring thus serving also as a locking ring for resisting relative axial separation of the two grooved members.

4. A bearing assembly as defined in claim 3 in which the outer relatively-rotatable member extends beyond an end of the inner one and the guard member and sealing ring constitute a substantially complete closure for the outer member.

5. A bearing assembly as defined in claim 3 in which the guard member is formed with an axial-interlock surface for engagement of a pulling tool therewith.

THOMAS L. FAWICK.

REFERENCES CITED

The following references are of record in the file of this patent:

UNITED STATES PATENTS

| Number | Name | Date |
| --- | --- | --- |
| 1,419,983 | Reedy | June 20, 1922 |
| 1,872,251 | Cowin | Aug. 16, 1932 |
| 2,265,951 | Miner | Dec. 9, 1941 |
| 2,304,198 | Overstrom | Dec. 8, 1942 |
| 2,401,379 | Smith | June 4, 1946 |
| 2,410,808 | Christensen | Nov. 12, 1946 |